United States Patent
Eta

(10) Patent No.: US 8,935,942 B2
(45) Date of Patent: Jan. 20, 2015

(54) PROCESS FOR MANUFACTURING OF GLASS FILM AND MANUFACTURING DEVICE THEREOF

(75) Inventor: Michiharu Eta, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 449 days.

(21) Appl. No.: 13/010,956

(22) Filed: Jan. 21, 2011

(65) Prior Publication Data

US 2011/0197634 A1 Aug. 18, 2011

(30) Foreign Application Priority Data

Feb. 18, 2010 (JP) .................................. 2010-033780

(51) Int. Cl.
  *C03B 17/06* (2006.01)
  *C03B 21/02* (2006.01)
  *C03B 23/037* (2006.01)
  *C03B 33/02* (2006.01)

(52) U.S. Cl.
  CPC ............... *C03B 17/06* (2013.01); *C03B 17/064* (2013.01); *C03B 23/037* (2013.01); *C03B 33/0215* (2013.01)
  USPC ..................... 65/53; 65/97; 65/295

(58) Field of Classification Search
  CPC .... C03B 17/06; C03B 17/064; C03B 33/0235
  USPC ................................ 65/97, 53, 295
  See application file for complete search history.

(56) References Cited

U.S. PATENT DOCUMENTS

| | | | |
|---|---|---|---|
| 3,622,298 A * | 11/1971 | Machlan et al. | 65/31 |
| 3,666,583 A * | 5/1972 | Pei et al. | 65/34 |
| 4,268,296 A * | 5/1981 | Pfaender | 65/90 |
| 4,891,054 A * | 1/1990 | Bricker et al. | 65/105 |
| 6,092,392 A * | 7/2000 | Verlinden et al. | 65/30.1 |
| 6,502,423 B1 * | 1/2003 | Ostendarp et al. | 65/29.14 |

(Continued)

FOREIGN PATENT DOCUMENTS

| | | |
|---|---|---|
| JP | 2000-335928 | 12/2000 |
| JP | 2002-544104 | 12/2002 |

(Continued)

OTHER PUBLICATIONS

International Search Report issued Apr. 5, 2011 in corresponding International (PCT) Application No. PCT/JP2011/050918.

(Continued)

*Primary Examiner* — Jason L Lazorcik

(74) *Attorney, Agent, or Firm* — Wenderoth, Lind & Ponack, L.L.P.

(57) ABSTRACT

Provided is a manufacturing device (1) of a glass film, the device including: a forming apparatus (10) of a glass film ribbon (G) for forming molten glass or a glass base material for secondary processing into a glass film ribbon (G); a winding apparatus (20) for winding, into a roll shape, the glass film ribbon (G), which is drawn downward while being cooled; and a width direction cutting apparatus (30) for cutting the glass film ribbon (G) along its width direction at a position before being wound by the winding apparatus (20). A vertical distance (h) from the glass film ribbon (G) forming start position by the forming apparatus (10) to a glass film ribbon (G) cutting position by the width direction cutting apparatus (30) is set as five times or more of a dimension in the width direction of the glass film ribbon (G).

7 Claims, 2 Drawing Sheets

(56) References Cited

U.S. PATENT DOCUMENTS

| | | | |
|---|---|---|---|
| 6,532,770 B2* | 3/2003 | Uhlik et al. | 65/97 |
| 6,758,064 B1* | 7/2004 | Kariya | 65/91 |
| 7,059,154 B1 | 6/2006 | Quentin et al. | |
| 7,685,840 B2* | 3/2010 | Allaire et al. | 65/29.12 |
| 8,113,015 B2* | 2/2012 | Burdette | 65/93 |
| 8,210,001 B2* | 7/2012 | Allan et al. | 65/53 |
| 8,241,751 B2* | 8/2012 | Tomamoto et al. | 428/426 |
| 2007/0178281 A1 | 8/2007 | Nakamura et al. | |
| 2009/0229633 A1 | 9/2009 | Kato et al. | |
| 2009/0314032 A1 | 12/2009 | Tomamoto et al. | |
| 2010/0107848 A1* | 5/2010 | Joseph et al. | 83/862 |
| 2010/0192634 A1* | 8/2010 | Higuchi et al. | 65/60.1 |
| 2010/0218557 A1* | 9/2010 | Aniolek et al. | 65/97 |
| 2010/0319402 A1* | 12/2010 | Burdette | 65/111 |
| 2011/0059296 A1* | 3/2011 | Wada et al. | 428/157 |
| 2011/0177287 A1 | 7/2011 | Kato et al. | |
| 2011/0197634 A1* | 8/2011 | Eta | 65/97 |
| 2011/0200812 A1 | 8/2011 | Tomamoto et al. | |
| 2011/0277507 A1* | 11/2011 | Lu et al. | 65/97 |
| 2012/0103018 A1* | 5/2012 | Lu et al. | 65/29.12 |

FOREIGN PATENT DOCUMENTS

| | | |
|---|---|---|
| JP | 2008-133174 | 6/2006 |
| JP | 2007-197280 | 8/2007 |
| JP | 2010-132349 | 6/2010 |
| JP | 2012-136413 | 7/2012 |
| WO | 02/14229 | 2/2002 |

OTHER PUBLICATIONS

International Preliminary Report on Patentability and Written Opinion of the International Searching Authority issued Sep. 27, 2012 in International (PCT) Application No. PCT/JP2011/050918.

Extended European Search Report dated Aug. 23, 2013 issued in corresponding European Application No. 11744464.6.

European Search Report dated Oct. 15, 2014 issued in corresponding European Application No. 11 744 464.6.

* cited by examiner

PROCESS FOR MANUFACTURING OF GLASS FILM AND MANUFACTURING DEVICE THEREOF

TECHNICAL FIELD

The present invention relates to a process for manufacturing of a glass film and a manufacturing device thereof, in particular, a technology for manufacturing a long glass film, the technology even enabling winding of a glass film into a roll shape.

BACKGROUND ART

As is well known, flat panel displays (hereinafter, simply referred to as FPDs) have become mainstream as image display devices in recent years, the FPDs being typified by a liquid crystal display (LCD), a plasma display (PDP), a field emission display (FED), an OLED display (OLED), and the like. Progress is being made toward reducing the weight of those FPDs, and hence glass substrates used for the FPDs are also currently becoming thinner.

Further, for example, organic light-emitting diodes are used not only to flicker three fine primary colors with TFTs as in displays, but also to emit monochromatic light (for example, white color light), and hence the organic light-emitting diodes are beginning to be used also as flat surface light sources such as a backlight of an LCD and a light source of an indoor lighting device. Further, in a lighting device using organic light-emitting diodes, the shape of its light-emitting surface can be freely changed if flexibility can only be imparted to a glass substrate. Thus, from the viewpoint of securing sufficient flexibility, progress is also being made toward formation of a very thin plate glass (formation of a glass film) in manufacturing a glass substrate used in the lighting device of this kind.

Here, for example, Patent Literature 1 described below proposes, as a process for manufacturing a belt-like glass having a thin plate shape, a so-called glass film, a technology which involves forming a glass film ribbon having a thickness of 30 μm to 2,000 μm by a down-draw method, in particular, a slot down-draw method, drawing the glass film ribbon vertically downward, bending (inflecting) the glass film ribbon in the horizontal direction, cutting off both ends of the glass film ribbon by using a laser, and then cutting the glass film ribbon into a piece having a predetermined length, thereby providing a glass substrate having a predetermined size. Patent Literature 1 also describes that a glass film ribbon having a thickness of 30 μm to 400 μm can be wound (by using predetermined rollers or the like) after its both ends are cut, without being cut into a piece having a predetermined length.

Moreover, Patent Literature 2 proposes a technology which involves forming a glass film ribbon having a thickness of less than 0.7 mm by a so-called float process, trimming both end portions in the width direction of the glass film ribbon on a molten tin bath, and winding the resultant glass film ribbon into a roll shape.

As described above, a glass film ribbon can be wound into a roll shape by taking advantage of its excellent flexibility unlike conventional glass substrates, and hence the glass film ribbon can be supplied to a production system such as a roll-to-roll manufacturing method.

CITATION LIST

Patent Literature

Patent Literature 1: JP 2000-335928 A
Patent Literature 2: JP 2002-544104 A

SUMMARY OF INVENTION

Technical Problem

A glass film ribbon is manufactured by forming molten glass into a thin plate shape and further drawing the glass while its viscosity is relatively low, thereby forming a film ribbon having a predetermined dimension in the width direction and a predetermined thickness. In this case, the glass film ribbon may have warpage or curved deformation in which a glass film ribbon is curved in the width direction with a large curvature. In the formation of a glass film ribbon, those deformations occur frequently in combination with each other. Further, those deformations are almost settled during the period in which molten glass is formed into a glass film ribbon and cooling the glass film ribbon is completed.

When a long glass film ribbon is wound, in particular, curved deformation out of the above-mentioned deformations frequently occurs as a problem. However, a long glass film ribbon having curved deformation is settled in the state of curved deformation in its width direction with a large curvature, and hence the long glass film ribbon is liable to be wound in such a roll shape that the ends of layers are displaced to each other in the width direction of the long glass film ribbon so as to form a so-called bamboo shoot shape. With such shape, the glass film cannot be provided as a glass roll, leading to yield reduction.

In order to solve this problem, for example, Patent Literature 1 described below discloses a technology for preventing curved deformation from occurring in a glass film ribbon by incorporating a mechanism for monitoring and adjusting the degree of curved deformation (including the presence or absence of curved deformation) of a glass film ribbon, into a forming apparatus of a glass film ribbon. However, in the technology disclosed in Patent Literature 1 described above, the device for monitoring the degree of curved deformation of a glass film ribbon is installed in a site where the glass film ribbon has already been cooled sufficiently or to a certain extent. As described above, deformation of a glass film ribbon occurs and is settled during the period in which molten glass is formed into a glass film ribbon shape and cooling the glass film ribbon is completed. Thus, even if the monitoring device senses the occurrence of curved deformation of an already cooled glass film ribbon and instructs an adjustment mechanism such as a displacement mechanism of a pulling-out roller to do feedback, an inevitable time lag occurs. Thus, before the above-mentioned adjustment work starts, a glass film ribbon having curved deformation is wound to form a roll body of a glass film, which includes a wound part in which the ends of layers are displaced to each other so as to form a bamboo shoot shape, causing yield reduction.

Further, if there is adopted a method of correcting curved deformation of a glass film ribbon by positively imparting a corrective force to the glass film ribbon, as in Patent Literature 1 described above, the imparting of a corrective force causes a new strain. Thus, it becomes necessary to continuously do work of correcting again deformation such as curved deformation caused by the new strain. Glass is a brittle material, and hence, if a corrective force is continuously applied to a glass film ribbon, strain accumulates in the glass film ribbon, finally leading, in some cases, to the situation in which the glass film ribbon is destroyed (breaks). In this case, it is difficult to continue the winding work of a glass film ribbon precisely and stably, and much unnecessary work must be done.

In consideration of the circumstances described above, a technical problem to be solved by the present invention herein is to precisely manufacture a glass film ribbon whose yield reduction does not occur, in which curved deformation does not occur, and which can be wound into a roll shape.

Solution to Problem

The problem is solved by a process for manufacturing of a glass film according to the present invention. That is, the manufacturing process includes: forming molten glass or a glass base material for secondary processing into a glass film ribbon; winding, into a roll shape, the glass film ribbon, which is drawn downward while being cooled; and cutting the glass film ribbon along its width direction at a position before being wound, in which a vertical distance from a glass film ribbon forming start position to a glass film ribbon cutting position is set as five times or more of a dimension in the width direction of the glass film ribbon. Note that the "glass film ribbon forming start position" herein varies according to a forming method to be adopted. For example, when a slot down-draw method is adopted as the method of forming a glass film ribbon, a slot (slit) aperture portion for drawing molten glass downward corresponds to the above-mentioned forming start position. Further, when a overflow down-draw method is adopted, the lower end of a trough at which flows of molten glass that have overflowed join corresponds to the above-mentioned forming start position. When a redraw method is adopted, a position at which a glass base material for secondary processing starts to be stretched in a predetermined direction after being heated with a burner or the like corresponds to the above-mentioned forming start position.

As described above, after being formed so as to have a predetermined shape, the glass film ribbon is drawn downward while being cooled, and the weight of the glass film ribbon drawn downward, in addition to a pulling force of rollers for winding the glass film ribbon into a roll shape, is applied to the glass film ribbon itself. That is, when a predetermined site (for example, a site under cooling) of the glass film ribbon drawn along the vertical direction is defined as a basis, the weight of a site positioned below the predetermined site generates a pulling force for pulling vertically downward the above-mentioned predetermined site of the glass film ribbon. The pulling force should uniformly act in the vertical direction and on the whole region in the width direction of the glass film ribbon. However, when the glass film ribbon has warpage or curved deformation because of a certain reason, the center of gravity of the glass film ribbon may be displaced from a virtual vertical line passing on the forming start position. In this case, if the above-mentioned pulling force does not act sufficiently, such state as described above continues for a long time. Thus, even if a force attempting to return the center of gravity of the glass film ribbon onto the above-mentioned virtual vertical line acts on the glass film ribbon afterward, deformation of the glass film ribbon significantly remains because of a time lag. As a result, a fatal defect in quality may be caused. Then, the inventors of the present invention have, as described above, taken notice of the ratio between the vertical distance from the glass film ribbon forming start position to the glass film ribbon cutting position along its width direction and the dimension in the width direction of the glass film ribbon, and have intensively studied on the ratio of the vertical distance to the dimension in the width direction. As a result, the inventors have found that, when the above-mentioned ratio is set to a predetermined value or more, specifically, when the above-mentioned ratio is set to 5 or more, the force attempting to return the center of gravity of the glass film ribbon onto the virtual vertical line acts promptly and effectively on the glass film ribbon before being wound, without any time lag. Thus, for example, when a glass film ribbon is manufactured so as to have a predetermined dimension in the width direction, the vertical distance is made longer as the dimension in the width direction of the glass film ribbon becomes larger. As a result, a site at a relatively upper position in the glass film ribbon continuously formed, that is, from where the glass film ribbon is immediately after forming to where the glass film ribbon is under cooling, is naturally pulled vertically downward by the self weight of the portion positioned below that site. Then, even if the center of gravity of the glass film ribbon is deviated from the virtual vertical line or becomes likely to be deviated from the virtual vertical line, the pulling force causes the force attempting to return the center of gravity onto the virtual vertical line to act on the glass film ribbon promptly, and hence the deformation including curved deformation of the glass film ribbon drawn downward can be reduced as much as possible. Thus, even if a monitoring device or an adjustment mechanism is not particularly provided, when the glass film ribbon is cut along its width direction and wound into a roll shape, a state in which the ends of layers are displaced to each other so as to form a so-called bamboo shoot shape does not take place. Further, according to the manufacturing process of the present invention, the position of the center of gravity of the glass film ribbon being drawn is adjusted by the self weight, and hence, once the above-mentioned ratio of the vertical distance to the dimension in the width direction is set, a long glass film ribbon can be continuously manufactured stably afterward. As a result, it is possible to continuously obtain stably a high-precision roll body provided by winding a glass film, in which the positions of the ends in the width direction of wound layers are constantly aligned.

In this case, a thickness of the glass film ribbon may be set as 300 μm or less at the central portion in the width direction of the glass film ribbon.

This is because, if the thickness of the glass film ribbon to be wound into a roll shape exceeds 300 μm, the inner diameter of a roll body of the glass film needs to be theoretically 420 mm or more (preferably 700 mm or more), and a glass roll obtained after winding is liable to have an outer diameter of more than 2,000 mm, resulting in difficulty in actually transporting the glass roll by using a container or the like. Because of the reason described above, if winding into a roll shape is supposed, the thickness of the glass film ribbon at the central portion in the width direction is preferably 300 μm or less, more preferably 100 μm or less, still more preferably 50 μm or less.

Further, the forming the molten glass into the glass film ribbon may be carried out by an overflow down-draw method.

A roll-shaped product of a glass film obtained by winding a glass film ribbon into a roll shape is often supplied to a post process of the so-called roll-to-roll manufacturing method as described above. In the post process, work for providing fine elements and wirings are usually done on a surface of the glass film ribbon, and hence the surface of the glass film ribbon is required to have very good smoothness (degree of flatness). However, when a forming method using a nozzle such as a slot down-draw method is adopted, molten glass is discharged from a forming nozzle, and hence the inner surface shape of the slot of the forming nozzle is reflected (in other words, transcribed) on the surfaces of the formed glass film ribbon in some cases. As a result, it is difficult to obtain a glass film ribbon having a surface with good smoothness and high precision. On the other hand, when the overflow down-draw method is adopted, the surfaces of a glass film ribbon come into contact only with an outer gas (atmospheric gas in a forming apparatus), and hence it is possible to obtain very smooth surfaces. A similar effect can also be obtained by a so-called redraw method, which is carried out by heating a once solidified glass base material for secondary processing and stretching the resultant molten glass in a predetermined direction.

Further, both end portions in the width direction of the glass film ribbon may be cut by laser cutting, along the longitudinal direction of the glass film ribbon.

When molten glass is formed into a glass film ribbon, particularly when a glass film ribbon is formed by the above-mentioned overflow down-draw method, the thickness of both end portions in the width direction of the glass film ribbon frequently becomes larger than the thickness of the central portion in the width direction which is mainly used as a product portion. Thus, when a glass film ribbon is manufactured for the purpose of obtaining a glass film product having a uniform thickness, both end portions in the width direction of the formed glass film ribbon are cut by a predetermined method. Here, exemplified as a preferred method of cutting both end portions in the width direction of a glass film ribbon is a method using laser cutting. Because side end surfaces made by cutting both the end portions in the width direction by laser cutting are smooth and have a very small number of flaws, laser cutting is suitable for a glass film ribbon for a glass roll product. Here, the term "laser cutting" refers to a method of cutting a glass film ribbon by producing a thermal stress by heating with a laser and cooling with a refrigerant in a glass film ribbon and utilizing the thermal stress to cause an initial crack that has been preliminarily provided in the glass film ribbon to progress. According to the present invention, there is no fear that one of both end portions in the width direction of a glass film ribbon may move upward in the cutting operation, and hence the above-mentioned both end portions can be cut reliably and precisely.

In addition, it is favorable to set the vertical length of an annealing region positioned below the glass film ribbon forming start position to 50% or more and 80% or less of the vertical distance from the glass film ribbon forming start position to the glass film ribbon cutting position.

With this, it is possible to reduce (decrease) the cooling speed of a glass film ribbon formed from molten glass without lowering the forming speed of the glass film ribbon, making it possible to reduce the residual strain in the glass film ribbon. The residual strain in the glass film ribbon thus formed can be controlled to 0.5 nm or less in terms of a phase angle difference of light. Note that it is recommendable to set the vertical length of the annealing region to preferably 60% or more and 80% or less, more preferably 70% or more and 80% or less of the vertical distance from the glass film ribbon forming start position to the glass film ribbon cutting position.

Further, the above-mentioned problem is also solved by a manufacturing device of a glass film according to the present invention. That is, the manufacturing device of a glass film includes: a forming apparatus of a glass film ribbon for forming molten glass or a glass base material for secondary processing into a glass film ribbon; a winding apparatus for winding, into a roll shape, the glass film ribbon, which is drawn downward while being cooled; and a width direction cutting apparatus for cutting the glass film ribbon along its width direction at a position before being wound by the winding apparatus, in which a vertical distance from a glass film ribbon forming start position by the forming apparatus to a glass film ribbon cutting position by the width direction cutting apparatus is set as five times or more of a dimension in the width direction of the glass film ribbon.

The above-mentioned manufacturing device has the same technical features as the manufacturing process described in the beginning of this section, and hence the manufacturing device can provide the same functional effects as the manufacturing process can.

Advantageous Effects of Invention

As described above, according to each of the process for manufacturing of a glass film and the manufacturing device thereof according to the present invention, it is possible to precisely manufacture a glass film ribbon whose yield reduction does not occur, in which curved deformation does not occur, and which can be wound into a roll shape.

DESCRIPTION OF EMBODIMENT

One embodiment of the present invention is hereinafter described based on FIG. 1 and FIG. 2.

Figure 1:
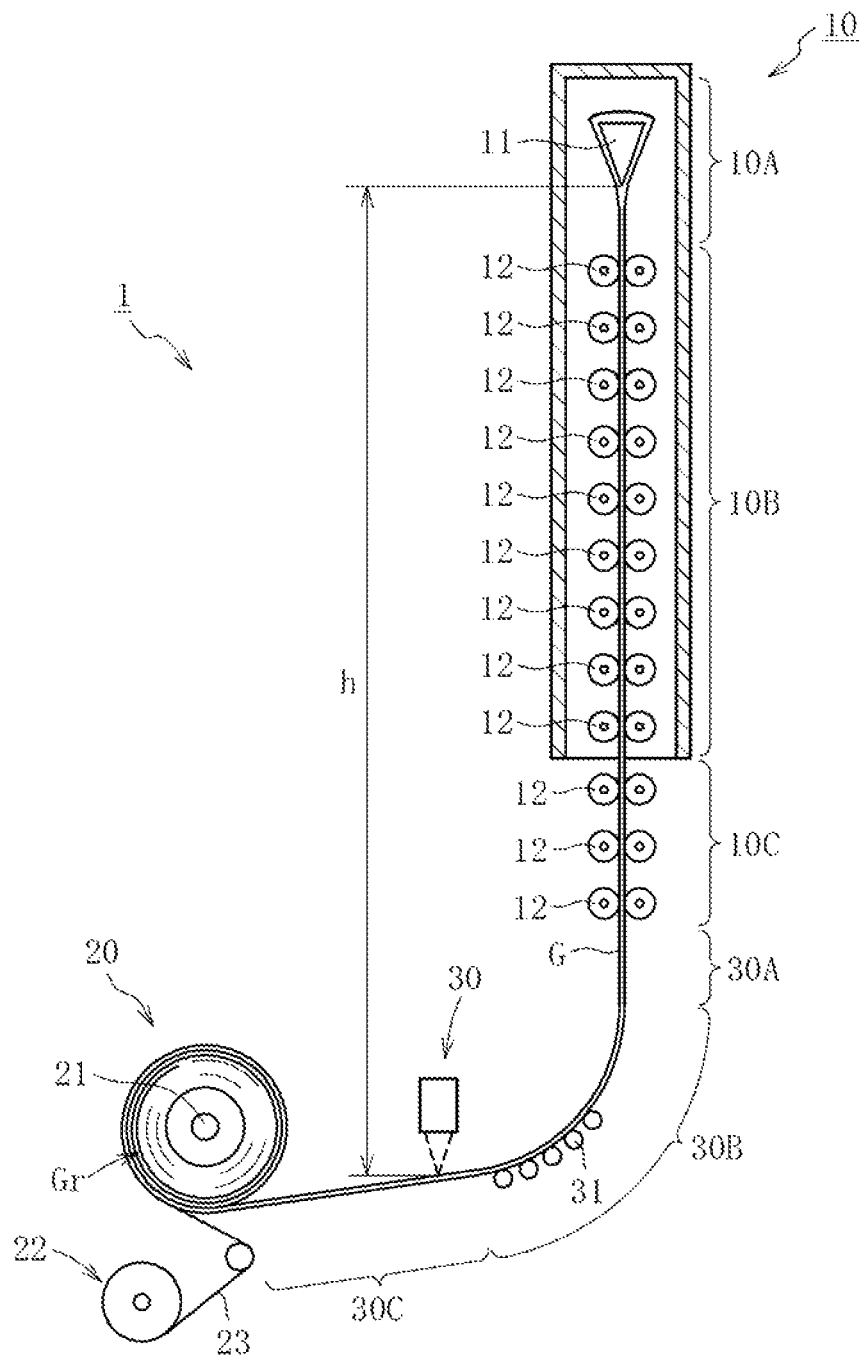
FIG. 1 is a side view of a manufacturing device of a glass film according to one embodiment of the present invention.

FIG. 1 is a side view of a manufacturing device 1 of a glass film according to the one embodiment of the present invention. As illustrated in the figure, the manufacturing device 1 includes a forming apparatus 10 for forming molten glass into a glass film ribbon G by a so-called overflow down-draw method, and a winding apparatus 20 for winding, into a roll shape, the glass film ribbon G, which is drawn downward while being cooled. In the manufacturing device 1, a width direction cutting apparatus 30 arranged in the upstream side of the winding apparatus 20 is used to cut the glass film ribbon G drawn downward along its width direction, to thereby yield a roll body Gr of a glass film having a predetermined roll thickness.

Specifically, the forming apparatus 10 internally includes a trough 11 having an outer surface with a wedge shape in the cross section, in which, by supplying glass melted in a melting furnace not shown (molten glass) into the trough 11, the molten glass overflows from the top portion of the trough 11. Further, a flow of the molten glass that has overflowed falls on each of both sides having a wedge shape in the cross section of the trough 11 and joins at the lower end of the trough 11, thereby starting formation from the molten glass into the glass film ribbon G. The glass film ribbon G formed as described above in a forming region 10A (see FIG. 1 and FIG. 2) positioned at the uppermost portion of the forming apparatus 10 flows down as it is, reaching an annealing region 10B positioned below the forming region 10A. Then, in the annealing region 10B, while the glass film ribbon G is being annealed, its residual strain is removed (annealing treatment). Provided in the further downstream side of (below) the annealing region 10B is a cooling region 10C, in which the annealed glass film ribbon G is sufficiently cooled so as to reach a temperature around room temperature. The annealing region 10B and the cooling region 10C are each provided with a plurality of rollers 12 for delivering the glass film ribbon G downward. Note that in this embodiment, each roller 12 arranged at the uppermost portion (illustrated in FIG. 1) of each of the regions 10B and 10C in the forming apparatus 10 functions as a cooling roller for cooling the glass film ribbon G, and also functions as a driving roller for imparting a downward drawing force (pulling force) to the glass film ribbon G. The remaining rollers 12 play a function of drawing the glass film ribbon G while delivering it downward, as idling rollers, pulling rollers, or the like.

After having passed the cooling region 10C, the glass film ribbon G is drawn toward the winding apparatus 20 arranged at the most downstream side of the manufacturing device 1 of a glass film while changing its moving direction from the vertical direction to the horizontal direction. Specifically, a vertically drawing region 30A in which the glass film ribbon G is subsequently drawn vertically downward follows below the cooling region 10C, and a curving region 30B in which the glass film ribbon G is curved to change its drawing direction from the vertical direction to a substantially horizontal direction follows below the vertically drawing region 30A. In this embodiment, as illustrated in FIG. 1, the curving region 30B includes a plurality of curving aid rollers 31 for curving the glass film ribbon G at a predetermined curvature radius. The plurality of curving aid rollers 31 functions so as to deliver the glass film ribbon G toward a horizontally drawing region 30C described below. Moreover, the horizontally drawing region 30C in which the glass film ribbon G that have passed the curving region 30B is drawn toward a substantially horizontal direction follows in the downstream side of the curving region 30B (the left side of the curving region 30B in FIG. 1).

In addition, though not shown in the figure, a longitudinal direction cutting apparatus which is capable of cutting the glass film ribbon G along its longitudinal direction is arranged in the horizontally drawing region 30C so as to be able to continuously cut, along the longitudinal direction of the glass film ribbon G, both end portions Ge in the width direction (see FIG. 2) of the glass film ribbon G that has reached the horizontally drawing region 30C after having passed through the curving region 30B. Here, it is possible to use, as the longitudinal direction cutting apparatus, an apparatus which is used for cutting selvage portions (both end portions Ge in the width direction) along a scribe line by forming the scribe line with a diamond cutter and snapping the selvage portions, though its illustration is not shown. However, from the viewpoint of improving the strength of cutting surfaces, it is preferred to use a laser cutting apparatus provided with, for example, locally heating means, cooling means, a support member for supporting the back surface of a portion surrounding a planned cutting line on a glass film ribbon, and crack-forming means for forming an initial crack in the planned cutting line. By using the apparatus of this kind, the glass film ribbon G can be cut into both end portions Ge in its width direction and an effective portion of the glass film ribbon G, which is called full body cutting.

After both end portions Ge in the width direction of the glass film ribbon G are cut as described above, the effective portion of the glass film ribbon G obtained by removing those both end portions Ge in the width direction is wound into a roll shape around a winding core 21 of the winding apparatus 20. When the roll diameter (thickness) of a roll body Gr of a glass film produced by the winding reaches a predetermined size, the glass film ribbon G is cut in the width direction by the width direction cutting apparatus 30. In this case, the width direction cutting apparatus 30 is positioned in the more downstream side of a pathway for drawing the glass film ribbon G than the longitudinal direction cutting apparatus. However, in reverse to this, the longitudinal direction cutting apparatus may be positioned in the more downstream side than the width direction cutting apparatus 30. Through the above-mentioned processes, the roll body Gr of a glass film is obtained as a final product. Note that in this embodiment, as illustrated in FIG. 1 and FIG. 2, a protective sheet supply apparatus 22 is arranged near the winding apparatus 20 so that a protective sheet 23 supplied from the protective sheet supply apparatus 22 is wound with the glass film ribbon G, into a roll shape, around the winding core 21 of the winding apparatus 20.

Figure 2:
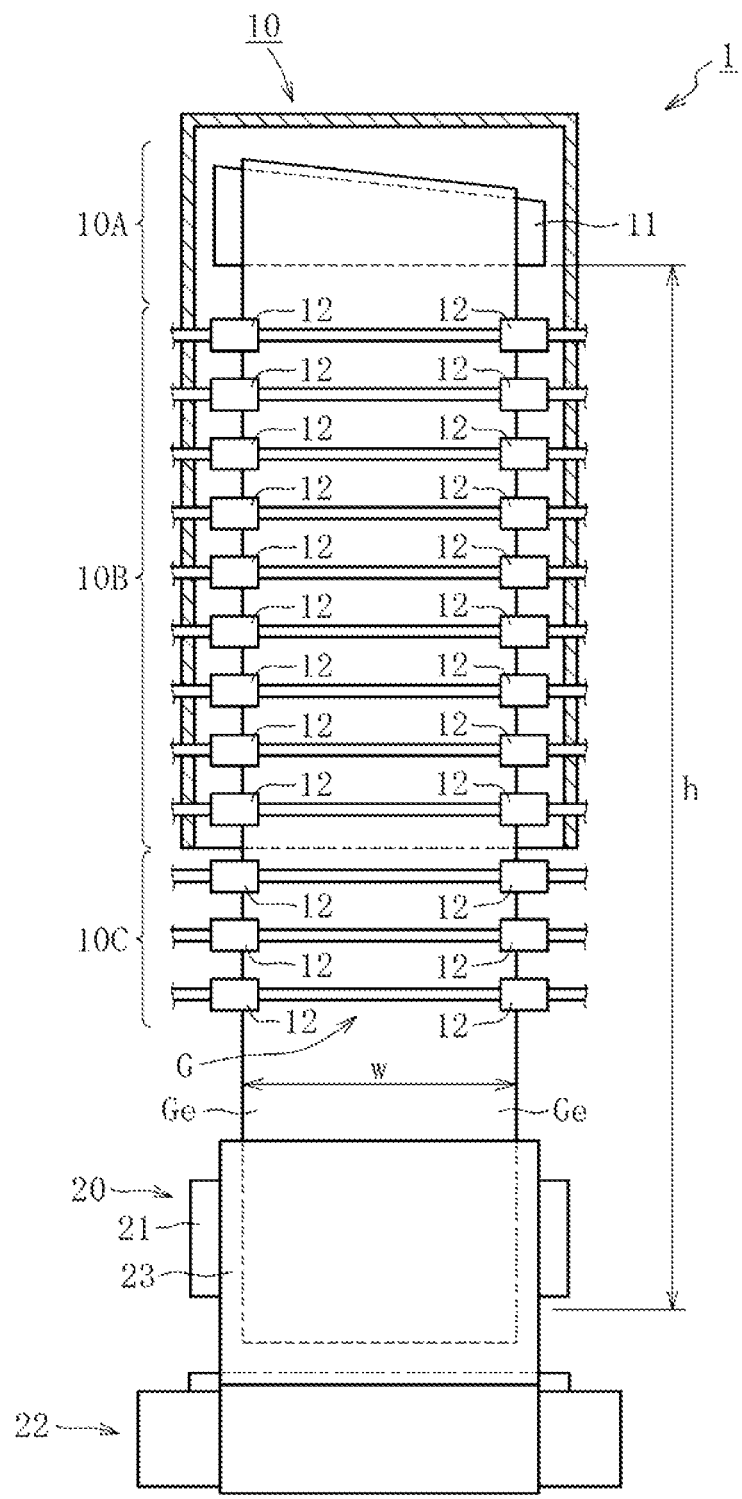
FIG. 2 is a front view of the manufacturing device of a glass film illustrated in FIG. 1.

Here, a vertical distance h (see FIG. 1) from the glass film ribbon G forming start position, that is, a position at which flows of molten glass that have overflowed join in a lower position of the trough 11, to a position at which the width direction cutting apparatus 30 cuts the glass film ribbon G is set as five times or more of a dimension in the width direction of the glass film ribbon G, to be more exact, a dimension in the width direction w of the glass film ribbon G which has passed through the cooling region 10C (see FIG. 2). That is, the ratio h/w of the vertical distance h to the dimension in the width direction w is 5 or more. As a result, sites of a glass film ribbon continuously formed, such as a relatively upper site, that is, a site below the forming start position (the lower end position of the trough 11) in the forming region 10A and the annealing region 10, are pulled vertically downward by the self weight of a site positioned below the sites described above. Even if the center of gravity of the glass film ribbon G deviates from a virtual vertical line passing the center in the width direction of the glass film ribbon G forming start position, the pulling force causes a force attempting to return the above-mentioned center of gravity onto the virtual vertical line to act on the glass film ribbon G promptly, and hence the deformation including curved deformation of the glass film ribbon G drawn downward can be reduced as much as possible. Thus, when the glass film ribbon G is cut in the width direction in a more downward region and is wound into a roll shape by the winding apparatus 20, the roll does not become a state in which the ends of layers are displaced to each other so as to form a so-called bamboo shoot shape. Further, if this manufacturing process is used, the position of the center of gravity of the glass film ribbon G under being drawn is adjusted by the self weight. Thus, once the above-mentioned ratio h/w of the vertical distance h to the dimension in the width direction w is set, stable winding work can be continuously done afterward. As a result, it is possible to stably obtain a high-precision roll body Gr of a glass film, in which the positions of the ends in the width direction of wound layers are constantly aligned.

In particular, when the vertically drawing region 30A, the curving region 30B, and the horizontally drawing region 30C are formed in sequence below the cooling region 10C as in this embodiment, the lengths of the forming region 10A, the cooling region 10C, and the curving region 30B are partially automatically determined depending on the material and size of a glass film ribbon G to be formed. Thus, it is preferred, in reality, to set the length of the vertically drawing region 30A larger than conventional lengths so that h/w≥5 is attained. With this, the glass film ribbon G can be wound highly precisely without a particularly significant change in a conventional configuration.

Further, when the above-mentioned process is adopted, the ratio h/w of the above-mentioned vertical distance h to the above-mentioned dimension in the width direction w is more preferably 7 or more, still more preferably 10 or more. By setting the ratio as described above, as shown in the results mentioned below, the degree of curvature (which is the degree of warpage and is different from the degree of curved deformation) of the glass film ribbon G can be significantly reduced, and hence a very-high-quality roll body Gr of a glass film can be obtained.

Here, the thickness of the glass film ribbon G at the central portion in the width direction is preferably 300 μm or less, more preferably 100 μm or less, still more preferably 50 μm or less. The glass film ribbon G may only have such flexibility as good enough for being able to be wound into a roll shape.

Further, the dimension in the width direction w of the glass film ribbon G is preferably 500 mm or more. That is, if the dimension in the width direction w of the glass film ribbon G is not 500 mm or more, the effect of drawing the glass film ribbon G by the above-mentioned self weight cannot be sufficiently exerted. Here, the lower limit of the dimension in the width direction w is more preferably 1,000 mm or more, still more preferably 1,500 mm or more. On the other hand, the upper limit of the dimension in the width direction w is preferably 6,000 mm or less. From the viewpoints of the function and performance of a glass film, there occurs no problem even if the upper limit is endlessly large. However, if the upper limit becomes too large (exceeds 6,000 mm), the height of equipment is required accordingly, and hence inconvenience in cost may be caused, which is the reason for setting to the above-mentioned upper limit.

One embodiment of the process for manufacturing of a glass film and the manufacturing device thereof according to the present invention was described above. However, the process and the device are not limited to the exemplified mode described above, and can be applied to any mode within the scope of the present invention.

In the above-mentioned embodiment, as illustrated in FIG. 1, the horizontally drawing region 30C has a configuration for causing the glass film ribbon G to slant downward toward the winding apparatus 20 side, but the horizontally drawing region 30C may be, for example, substantially horizontal or may be slanted slightly upward in reverse. In this case as well, the position serving as the lower basis for the vertical distance h is the position at which the glass film ribbon G is cut by the width direction cutting apparatus 30.

Further, in the above-mentioned embodiment, described was the case where the position at which both end portions Ge in the width direction of the glass film ribbon G were cut was set in the horizontally drawing region 30C, but this position is not particularly limited. Any position will do as the cutting position as long as the cutting operation can be carried out in the upstream side of the winding apparatus 20. The cutting operation can also be carried out in, for example, the curving region 30B or the vertically drawing region 30A. This is the same for the width direction cutting apparatus 30, and the glass film ribbon G may be cut along its width direction in the vertically drawing region 30A or the curving region 30B.

Further, when the width direction cutting apparatus 30 and the longitudinal direction cutting apparatus are provided in the vertically drawing region 30A as described above, it is possible to eliminate the horizontally drawing region 30C, or both the curving region 30B and the horizontally drawing region 30C. In this case, the winding apparatus 20 can be arranged at the downstream end of the vertically drawing region 30A or the curving region 30B.

Further, exemplified in the above description was the case where the present invention was applied to a manufacturing process of a glass film using the so-called overflow down-draw method. It is of course possible to adopt, other than the above-mentioned forming method, various kinds of methods of forming a glass film, for example, various kinds of down-draw methods such as a slot down-draw method, and a redraw method using a glass base material for secondary processing.

According to each of the process for manufacturing of a glass film and the manufacturing device thereof according to the above-mentioned description, it is possible to precisely manufacture a glass film ribbon whose yield reduction does not occur, in which curved deformation does not occur, and which can be wound into a roll shape. Thus, the present invention can be applied to not only a bulk production process of a glass substrate for an image display apparatus such as an FPD but also bulk production processes of all kinds of glass films that require the assurance of good quality.

In addition, it is needless to say that other specific modes can also be adopted in other matters than those described above as long as the other specific modes do not disregard the technical significance of the present invention.

EXAMPLES

Described hereinafter is experiments made by the inventors of the present invention in order to verify the utility of the present invention. In the experiments, each glass film ribbon was manufactured by changing the ratio of the vertical distance from the glass film ribbon forming start position to its cutting position along its width direction to the dimension in the width direction of the glass film ribbon, and the each glass film ribbon obtained was measured for the degree of curvature in its product state, to thereby evaluate the utility of the present invention.

Specifically, as shown in Table 1 below, by changing the dimension in the width direction of the glass film ribbon and the vertical distance from the lower end position of a trough for the glass film ribbon to the glass film ribbon cutting position along its width direction, each glass film ribbon was manufactured. The manufacturing process used in this case is an overflow down-draw method. Further, the thickness of the each glass film ribbon at the central portion in the width direction was set to 100 μm.

TABLE 1

|  | Example 1 | Example 2 | Example 3 | Comparative Example |
|---|---|---|---|---|
| Dimension in the width direction w [m] | 1.5 | 1.8 | 1.8 | 1.5 |
| Vertical distance h [m] | 7.5 | 13 | 18 | 7 |
| h/w | 5 | 7.2 | 10 | 4.7 |
| Degree of curvature [mm] | 8 | 6 | 2 | 20 |

10 m of the each glass film ribbon manufactured under the above-mentioned conditions were pulled out from a roll body of the glass film and placed on a surface plate. The distance from a virtual straight line drawn in the longitudinal direction between both ends in the longitudinal direction of the glass film ribbon to the curved concave end surface of the glass film ribbon was measured, and the maximum value [mm] thereof was defined as the degree of curvature.

The measurement results of the degree of curvature are shown in the undermost row of Table 1 described above. As seen from the table, when the ratio h/w of the vertical distance h to the dimension in the width direction w is less than 5, a large degree of curvature which is not preferred for a glass film product is exhibited. In contrast, when h/w is 5 or more, in particular, when h/w is 10, the degree of curvature measured was found to be very small.

REFERENCE SIGNS LIST 1 manufacturing device of glass film
10 forming apparatus
10A forming region
10B annealing region
10C cooling region
11 trough
12 roller
20 winding apparatus
21 winding core
22 protective sheet supply apparatus
23 protective sheet
30 width direction cutting apparatus
30A vertically drawing region
30B curving region
30C horizontally drawing region
31 curving aid roller
G glass film ribbon
Ge end portion in width direction
Gr roll body of glass film
h vertical distance
w dimension in width direction

The invention claimed is:

1. A process for manufacturing of a glass film, comprising:
    forming molten glass or a glass base material into a glass film ribbon;
    wherein a thickness of the glass film ribbon is set as 300 μm or less at a center portion in the width direction of the glass film ribbon,
    winding, into a roll shape, the glass film ribbon, which is drawn downward while being cooled; and
    cutting the glass film ribbon, along a width direction of the glass film ribbon, at a glass film ribbon cutting position before being wound,
    wherein an annealing region is provided below a glass film ribbon forming start position, a cooling region is provided below the annealing region, and a direction changing region is provided below the cooling region such that a drawing direction of the glass film ribbon changes from a vertical direction to a horizontal direction in the direction changing region,
    wherein the glass film ribbon cutting position is arranged such that the cutting of the glass film ribbon is performed after the drawing direction is changed in the direction changing
    wherein a vertical distance from the glass film ribbon forming start position to the glass film ribbon cutting position is set as five times or more of a dimension in the width direction of the glass film ribbon, and
    wherein a vertical length of the annealing region positioned below the glass film ribbon forming start position is set to 50% or more and 80% or less of the vertical distance from the glass film ribbon forming start position to the glass film ribbon cutting position.

2. The process for manufacturing of a glass film according to claim 1, wherein the forming of the molten glass into the glass film ribbon is carried out by an overflow down-draw method.

3. The process for manufacturing of a glass film according to claim 2, wherein the cutting of the glass film ribbon comprises cutting, along a longitudinal direction of the glass film ribbon, both end portions in the width direction of the glass film ribbon by laser cutting.

4. The process for manufacturing of a glass film according to claim 1, wherein the cutting of the glass film ribbon comprises cutting, along a longitudinal direction of the glass film ribbon, both end portions in the width direction of the glass film ribbon by laser cutting.

5. The process for manufacturing of a glass film according to claim 1, wherein the forming of the molten glass into the glass film ribbon is carried out by an overflow down-draw method.

6. The process for manufacturing of a glass film according to claim 5, wherein the of cutting the glass film ribbon comprises cutting, along a longitudinal direction of the glass film ribbon, both end portions in the width direction of the glass film ribbon by laser cutting.

7. The process for manufacturing of a glass film according to claim 1, wherein the cutting of the glass film ribbon comprises cutting, along a longitudinal direction of the glass film ribbon, both end portions in the width direction of the glass film ribbon by laser cutting.

* * * * *